US008007026B2

(12) United States Patent
Scott et al.

(10) Patent No.: US 8,007,026 B2

(45) Date of Patent: Aug. 30, 2011

(54) LOCKOUT FEATURE FOR FULL OPEN HINGE

(75) Inventors: Jason Douglas Scott, Farmington Hills, MI (US); Scott G. Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 12/476,496

(22) Filed: Jun. 2, 2009

(65) Prior Publication Data

US 2010/0301631 A1 Dec. 2, 2010

(51) Int. Cl.
*B60J 5/00* (2006.01)

(52) U.S. Cl. .................................................. 296/146.12

(58) Field of Classification Search ............. 296/146.12, 296/146.4; 160/191; 297/367 R; 224/42.21; 49/322, 386

See application file for complete search history.

(56) References Cited

U.S. PATENT DOCUMENTS 4,532,675 A * 8/1985 Salazar ........................... 16/335
4,719,665 A 1/1988 Bell
4,854,010 A * 8/1989 Maraghe et al. ................ 16/360
5,561,887 A 10/1996 Neag et al.
5,685,046 A * 11/1997 Neag et al. ...................... 16/366
6,038,738 A 3/2000 Neag et al.
6,052,870 A * 4/2000 Hagenlocher et al. .......... 16/347
6,175,991 B1 * 1/2001 Driesman et al. ............... 16/366
6,248,172 B1 * 6/2001 Shirotani et al. .............. 118/500
6,334,236 B1 * 1/2002 Kalliomaki ..................... 16/334
6,550,845 B1 4/2003 Pietryga
6,606,763 B1 * 8/2003 Bruckner ........................ 16/366
6,901,634 B2 * 6/2005 Shaw et al. ..................... 16/344
6,938,303 B2 * 9/2005 Watson et al. .................. 16/334
7,032,953 B2 * 4/2006 Rangnekar et al. ...... 296/146.11
7,150,492 B2 12/2006 Nania
7,249,645 B2 7/2007 Herrmann et al.
2007/0075565 A1 4/2007 Magsaam

* cited by examiner

*Primary Examiner* — Kiran B. Patel

(74) *Attorney, Agent, or Firm* — Gregory P. Brown; Price Heneveld LLP

(57) ABSTRACT

A hinge mechanism having a vehicle bracket that includes a pawl engagement member extending therefrom. A horizontally-rotating swing arm is rotatably coupled with the vehicle bracket. The hinge mechanism includes a pawl with an engagement portion and an abutment portion. The pawl is connected with the swing arm and operable between an engaged position and a disengaged position. A door bracket is rotatably coupled with the swing arm. A lever actuation member extends from the door bracket and is aligned to engage the abutment portion of the pawl.

20 Claims, 15 Drawing Sheets

LOCKOUT FEATURE FOR FULL OPEN HINGE

FIELD OF THE INVENTION

The present invention generally relates to a hinge mechanism, and more particularly, relates to a full open hinge mechanism for vehicle doors.

BACKGROUND OF THE PRESENT INVENTION

Vehicle doors utilize hinge mechanisms that allow the vehicle door to operate between open and closed positions.

SUMMARY OF THE PRESENT INVENTION

One aspect of the present invention includes a hinge mechanism having a vehicle bracket that includes a pawl engagement member extending therefrom. A horizontally-rotating swing arm is rotatably coupled with the vehicle bracket. The hinge mechanism includes a pawl with an engagement portion and an abutment portion. The pawl is connected with the swing arm and operable between an engaged position and a disengaged position. A door bracket is rotatably coupled with the swing arm. A lever actuation member extends from the door bracket and is aligned to engage the abutment portion of the pawl.

Another aspect of the present invention includes a hinge mechanism for a vehicle door, including a vehicle bracket having a pawl engagement member extending therefrom. A swing arm is operably coupled with the vehicle bracket at a first rotational axis. A pawl is connected to the swing arm and operable between an engaged position. The pawl is engaged with the pawl engagement member and prevents rotation of the swing arm relative to the vehicle bracket and a disengaged position. The pawl is disengaged from the pawl engagement member, thereby allowing rotation of the swing arm relative to the vehicle bracket. A door bracket is operably coupled with the swing arm at a second rotational axis. The door bracket has a lever actuation member in rotational alignment with the pawl, such that rotation of the door bracket a predetermined distance causes the lever actuation member to contact the pawl, thereby moving the pawl to the disengaged position and allowing rotation of the swing arm relative to the vehicle bracket.

Yet another aspect of the present invention includes a method of making a hinge mechanism for a vehicle. A swing arm is operably connected to a vehicle bracket having a pawl engagement member. The swing arm is operable between a deployed position and a retracted position. A pawl is operably connected and has an engagement portion and an abutment portion to the swing arm. The engagement portion is disengageably connected to the pawl with the pawl engagement member. A door bracket is rotatably connected to the swing arm. The door bracket is operable between an open position and a closed position. A latch actuation member extends from the door bracket. The door bracket and latch actuation member rotate toward the open position until the latch actuation member abuts the abutment portion of the pawl, causing the engagement portion of the pawl to disengage the pawl engagement member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
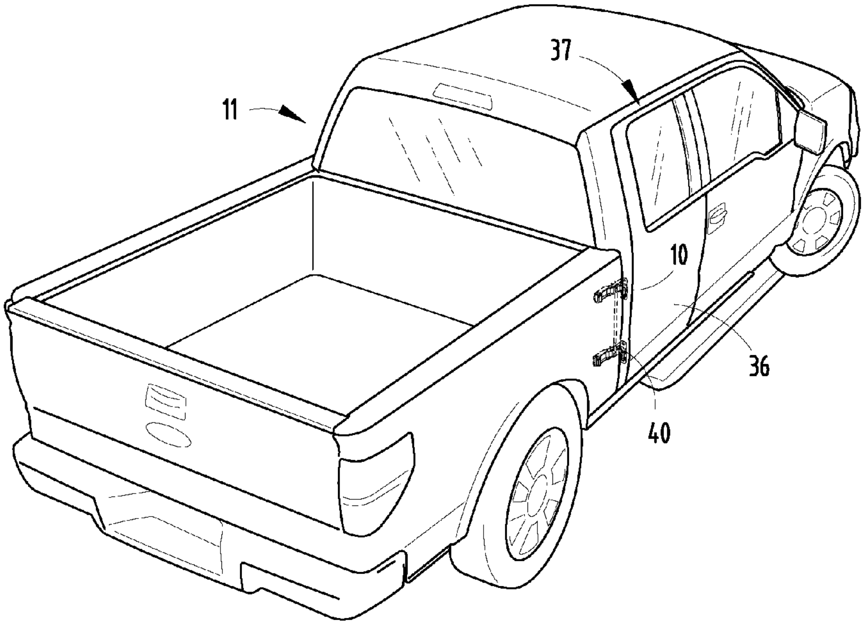
FIG. 1 is a top perspective view of one embodiment of the hinge mechanism incorporated into a vehicle.
Figure 1A:
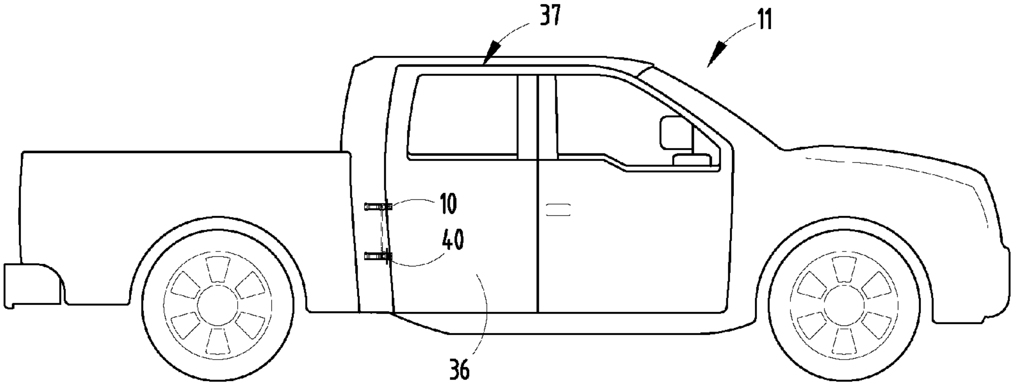
FIG. 1A is a side elevational view of the vehicle of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
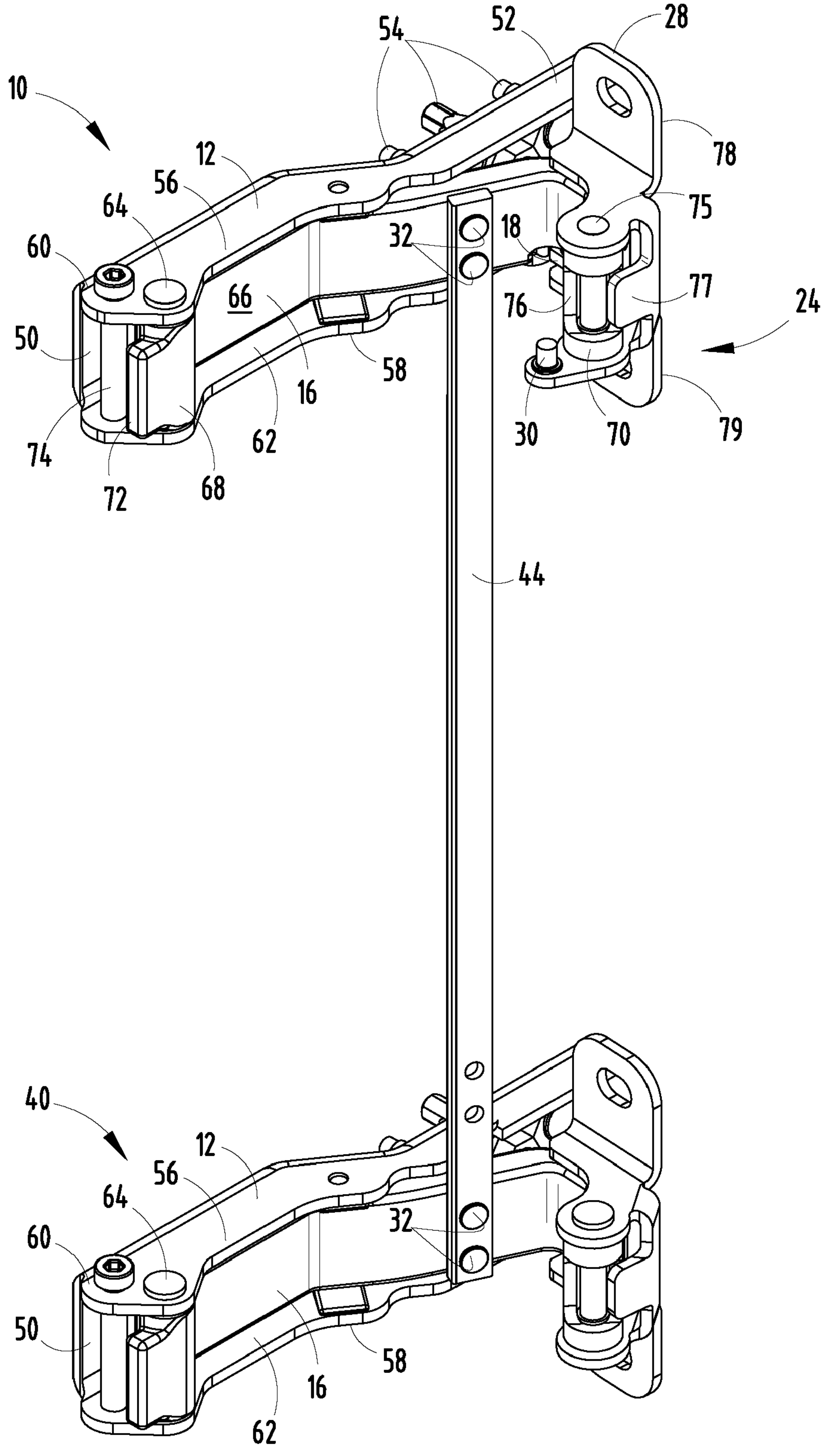
FIG. 2 is a top perspective view of top and bottom hinge mechanisms in the fully closed position.
Figure 2A:
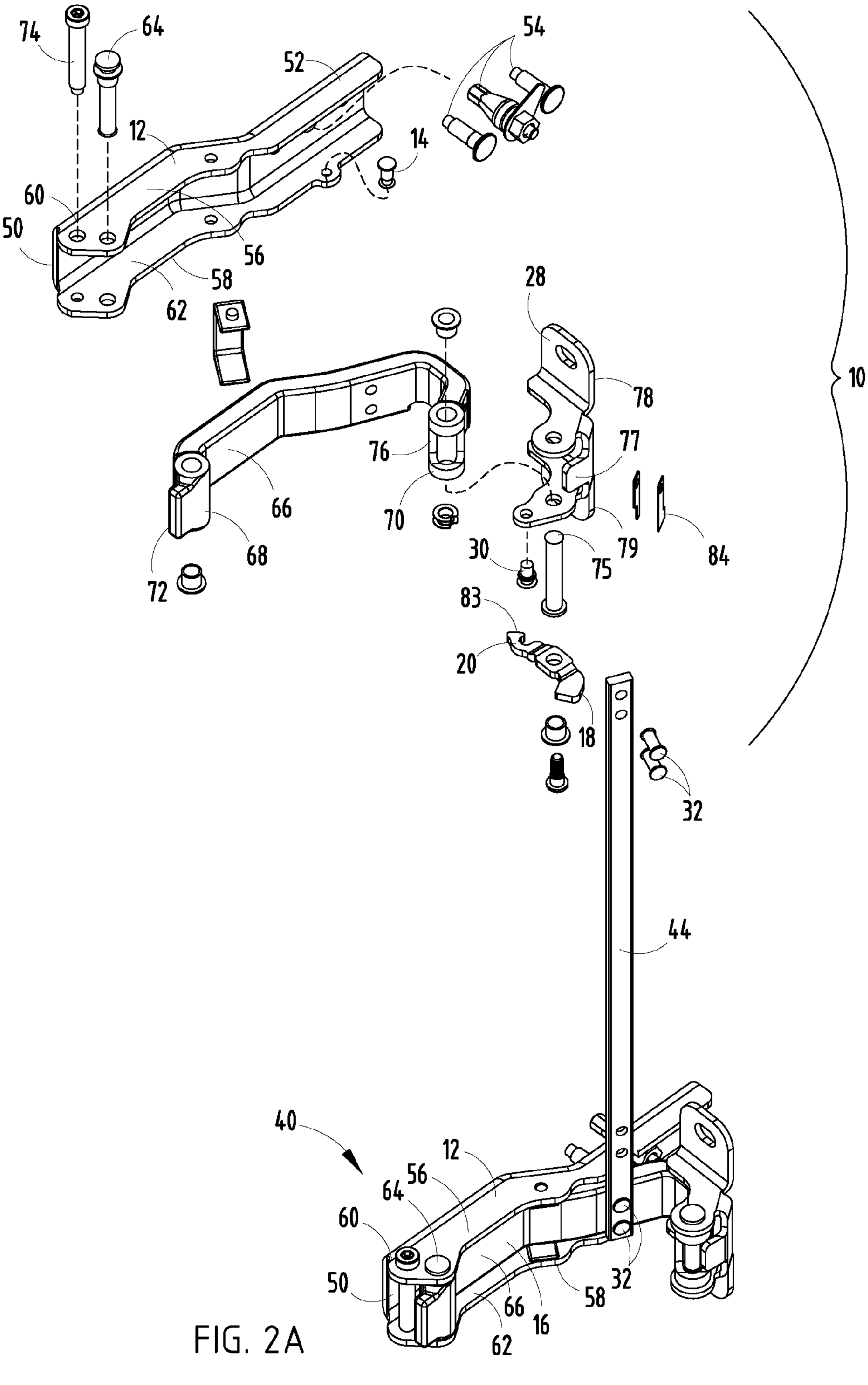
FIG. 2A is a partially exploded top perspective view of the top and bottom hinge mechanisms of FIG. 2.

As shown in FIGS. 1-2, reference numeral 10 generally designates a hinge mechanism for a vehicle 11 having a vehicle bracket 12 that includes a pawl engagement member 14 extending therefrom. A horizontally-rotating swing arm 16 is rotatably coupled with the vehicle bracket 12. The hinge mechanism 10 includes a pawl 18 with an engagement portion 20 and an abutment portion 22 (FIG. 3A). The pawl 18 is connected with the swing arm 16 and is operable between an engaged position 24 and a disengaged position 26 (FIG. 5C). A door bracket 28 is rotatably coupled with the swing arm 16.

A lever actuation member 30 extends from the door bracket 28 and is aligned to engage the abutment portion 22 of the pawl 18.

Figure 6:
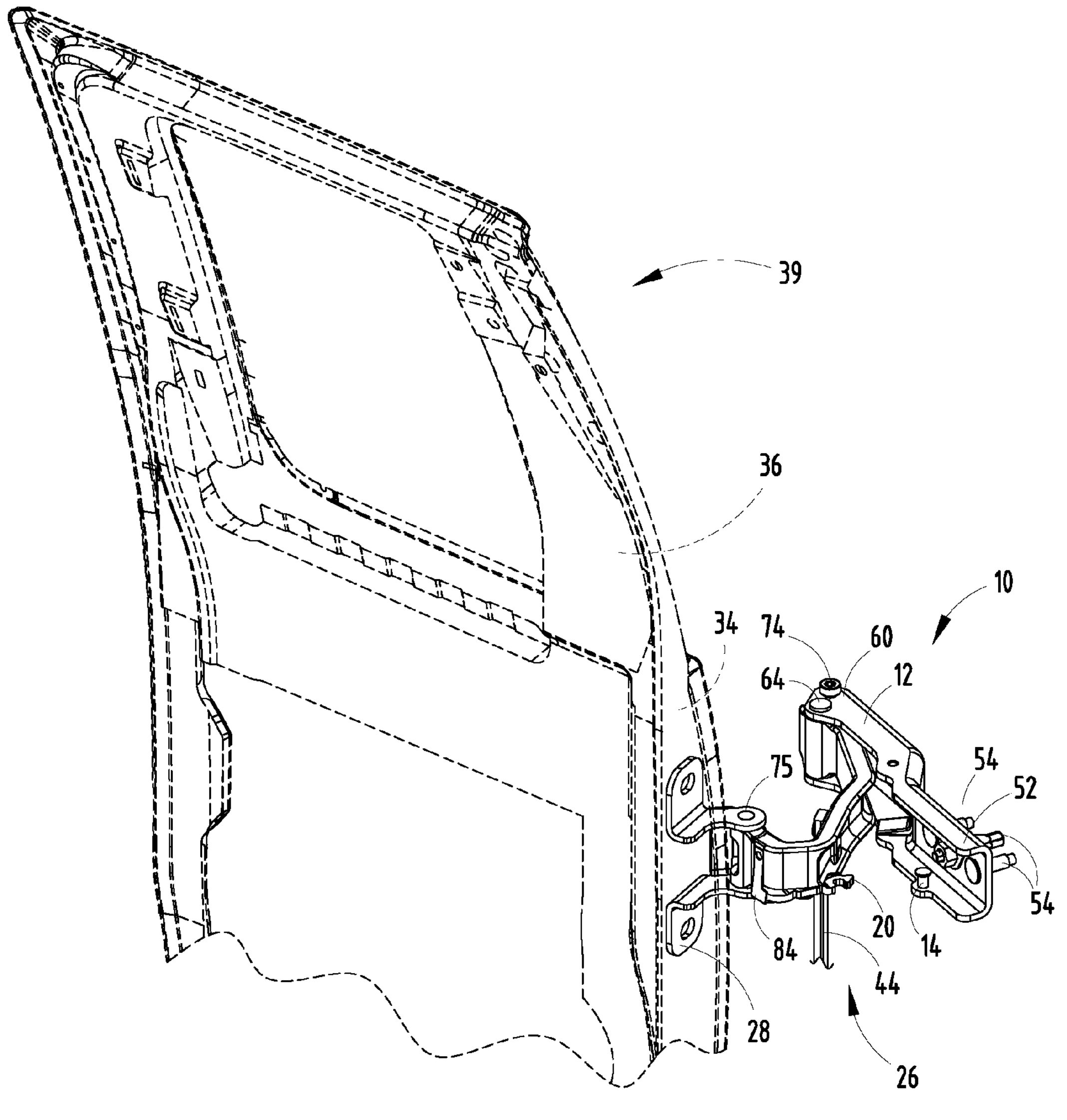
FIG. 6 is a front top perspective view of the hinge mechanism in the fully open position.
Figure 6A:
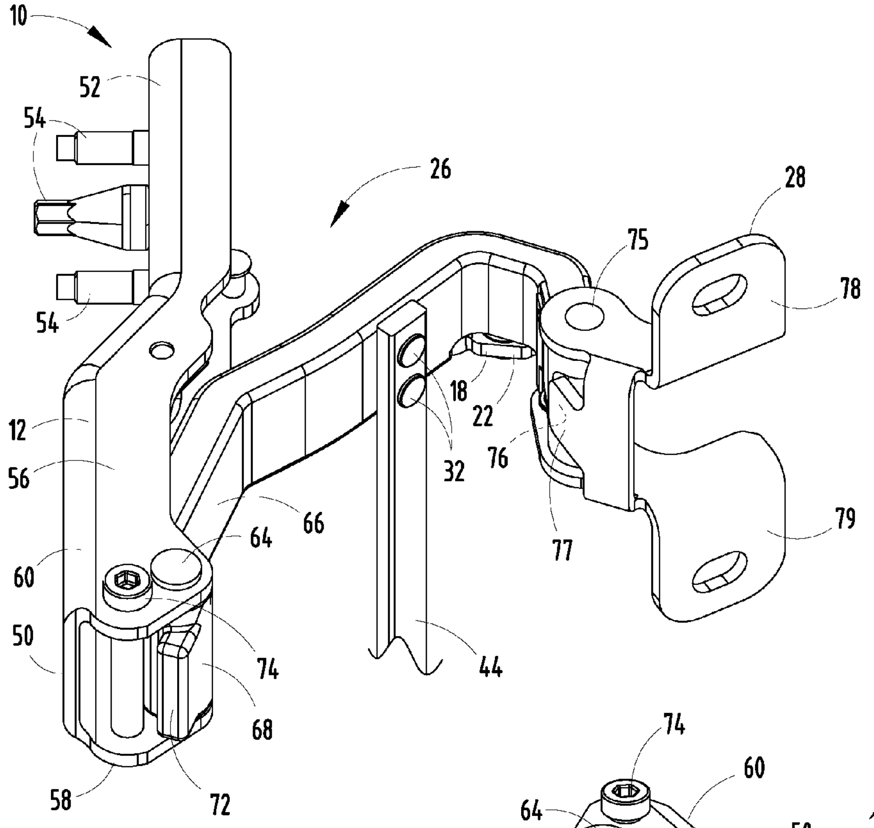
FIG. 6A is a rear top perspective view of the hinge mechanism of FIG. 6.
Figure 6B:
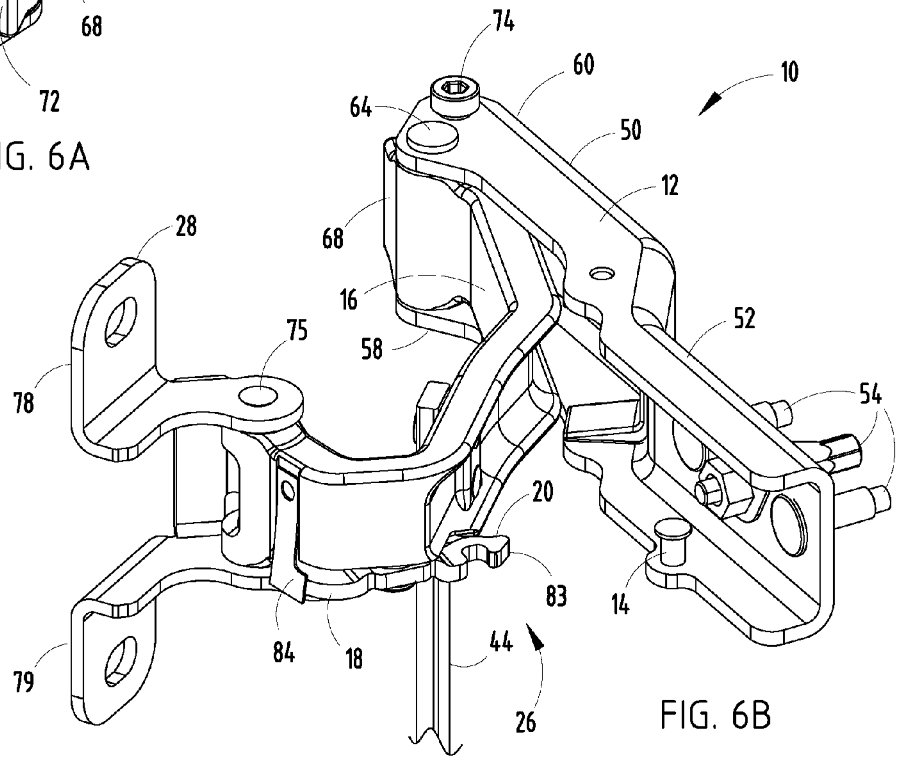
FIG. 6B is a front top perspective view of the hinge mechanism of FIG. 6.

Referring again to FIGS. 1-2, the hinge mechanism 10 is connected by mechanical fasteners 32 to a rear portion 34 of a vehicle door 36. Because the hinge mechanism 10 is able to open to 168 degrees, the vehicle door 36 is afforded the same range of motion. Although most of the hinge mechanism 10 is hidden when the vehicle door 36 is in a closed position 37, a portion of the vehicle brackets 12, swing arm 16, and door brackets 28 are visible when the vehicle door 36 is in a fully open position 39 (FIG. 6). The vehicle door 36 is connected to a first hinge mechanism 10 connected to the upper rear portion 34 of the vehicle door 36 and a second hinge mechanism 40 is connected to the lower rear portion 34 of the vehicle door 36. The first hinge mechanism 10 is connected to the second hinge mechanism 40 by a vertical linking member 44, which assists in the vehicle door 36 opening uniformly. The vertical linking member 44 is connected to the swing arm 16 of the first hinge mechanism 10 and to the swing arm 16 of the second hinge mechanism 40 by mechanical fasteners 32. For purposes of minimizing duplicity, the first hinge mechanism 10 will be explained in detail below. It will be understood by a person having ordinary skill in the art that the second hinge mechanism 40 functions in a similar manner to the first hinge mechanism 10.

As shown in the embodiment illustrated in FIG. 2, the vehicle bracket 12 includes an elongated body 50 having a forward end 52 with a plurality of mechanical fasteners 54 that fasten the vehicle bracket 12 to the vehicle 11. In addition, top and bottom flanges 56, 58 extend orthogonal to the elongated body 50, thereby providing rigidity and strength to the vehicle bracket 12. A rearward end 60 of the vehicle bracket 12 includes a recessed cavity 62 adapted to receive a portion of the swing arm 16 when the swing arm 16 is rotating inward, as will be discussed in further detail below. The rearward end 60 of the vehicle bracket 12 includes a pivot axis 64 about which the swing arm 16 rotates. The swing arm 16 includes a C-shaped body 66 and a proximal end 68 pivotally connected to the rearward end 60 of the vehicle bracket 12 and a distal end 70 pivotally connected to the door bracket 28. The proximal end 68 includes a protruding stop 72 that abuts a stop post 74 in the vehicle bracket 12 when the swing arm 16 has rotated fully outward. The door bracket 28 rotates about the distal end 70 at pivot axis 75. The distal end 70 of the swing arm 16 includes a recessed stop 76 adjacent to the pivotal connection of the distal end 70 of the swing arm 16 and the door bracket 28. The recessed stop 76 is adapted to abut a complementary protruding stop 77 on the door bracket 28. The protruding stop 77 and the recessed stop 76 of the door bracket 28 abut when the door bracket 28 has rotated fully outward. The door bracket 28 includes top and bottom flanges 78, 79 adapted to receive mechanical fasteners that secure the vehicle door 36 to the door bracket 28, and consequently, the hinge mechanism 10. In addition, the swing arm 16 extends between the first and second flanges 78, 79 of the door bracket 28 when the hinge mechanism 10 is in the closed position 37. The pawl 18 is also disposed between the first and second flanges 78, 79 of the door bracket 28; however, it is contemplated that the pawl 18 could be located outside of the first and second flanges 78, 79 of the door bracket 28.

Figure 3:
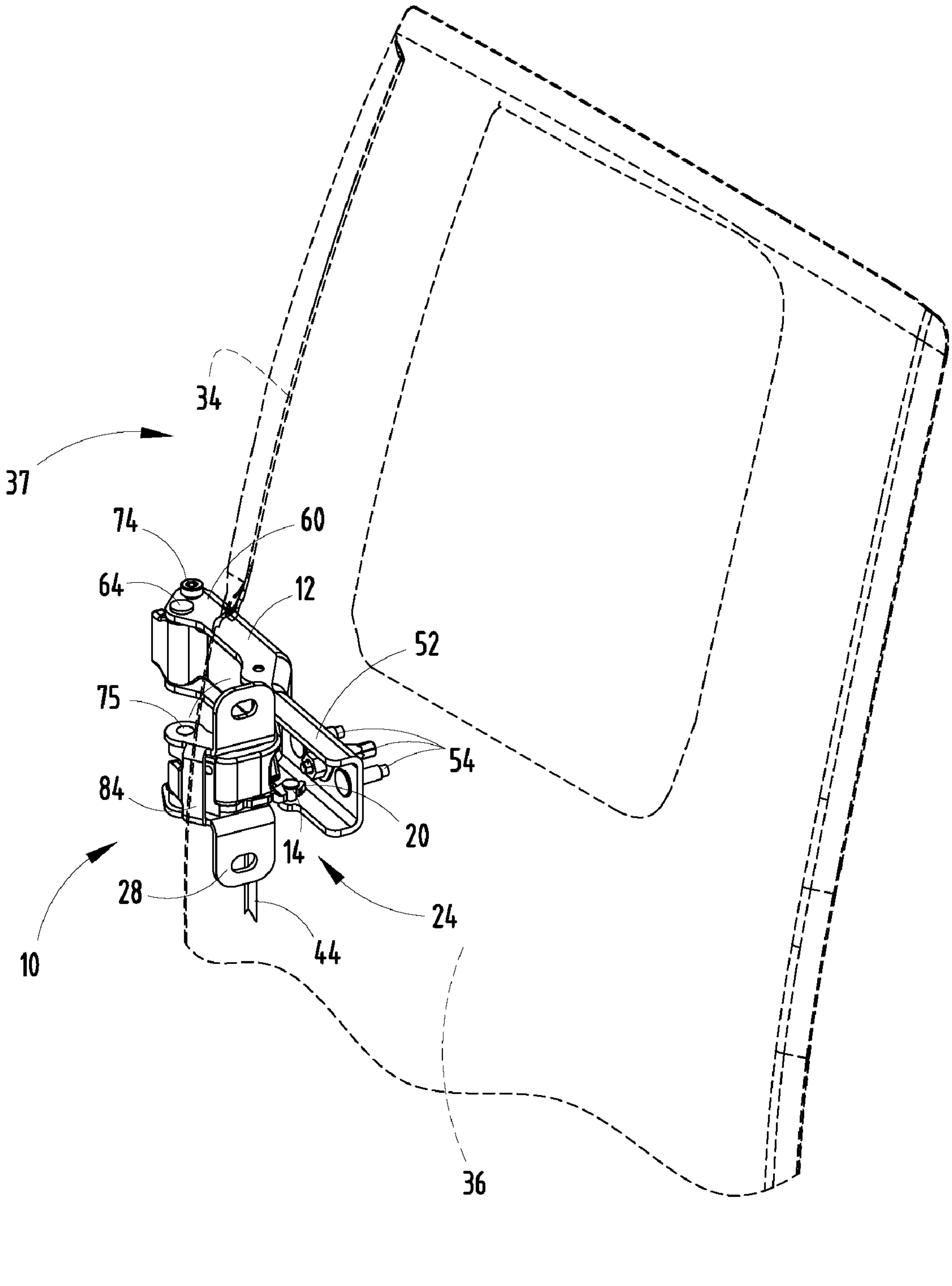
FIG. 3 is a top front perspective view of one embodiment of the hinge mechanism.
Figure 3A:
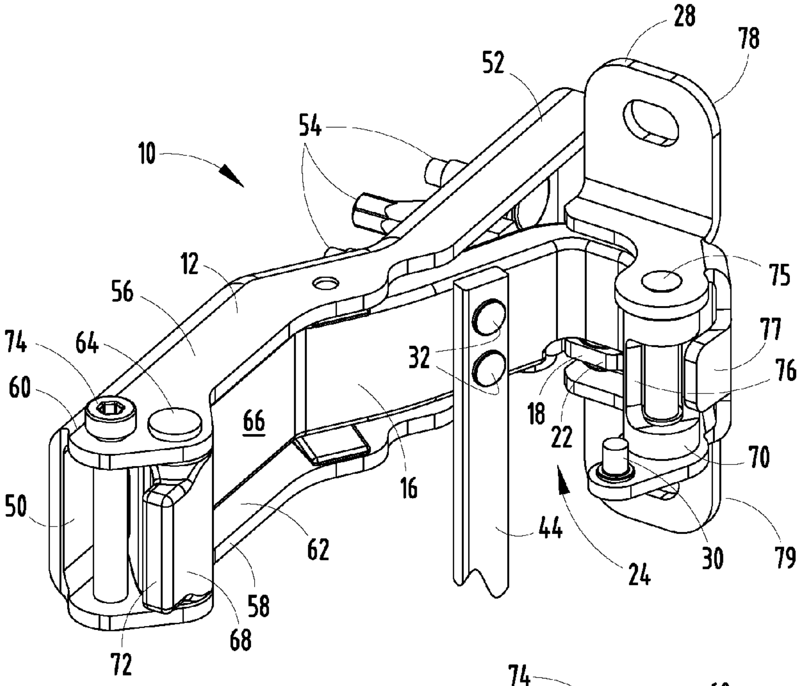
FIG. 3A is a rear top perspective view of the hinge mechanism of FIG. 3.
Figure 3B:
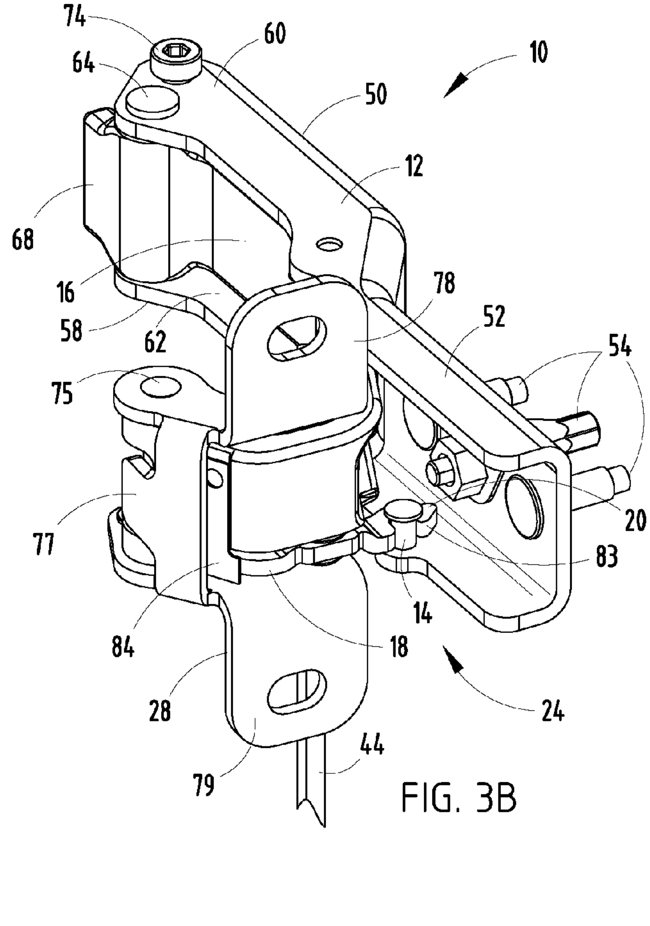
FIG. 3B is a front top perspective view of the hinge mechanism of FIG. 3.
Figure 3C:
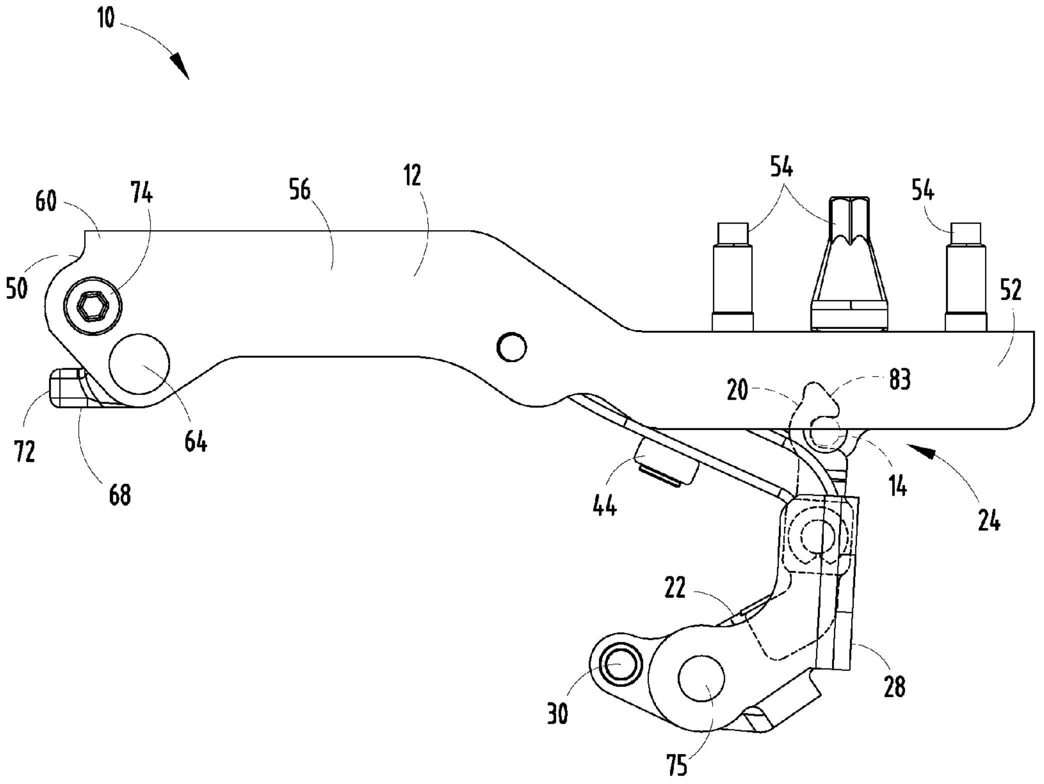
FIG. 3C is a top elevational view of the hinge mechanism of FIG. 3.

Referring now to FIGS. 3-3C, the hinge mechanism 10, and consequently, the vehicle door 36, is in the closed position 37. When the hinge mechanism 10 is in the closed position 37, the pawl 18 is in the engaged position 24. Specifically, the engagement portion 20 of the pawl 18 is operably coupled with the pawl engagement member 14. In the embodiment shown in FIG. 3A, the pawl engagement member 14 is an upwardly extending post and the engagement portion 20 of the pawl 18 is a C-shaped receiver. The engagement portion 20 includes an angled end 83 that facilitates capture of the pawl engagement member 14 when the door 36 is being closed. It is contemplated that the pawl engagement member 14 could be a C-shaped receiver and the pawl 18 could include an upwardly extending post, as well as other possible variations on this design. The pawl 18 is biased to the engaged position 24 by a leaf spring 84 disposed opposite the abutment portion 22 of the pawl 18. The leaf spring 84 keeps the pawl 18 from disengaging the pawl engagement member 14.

Figure 4:
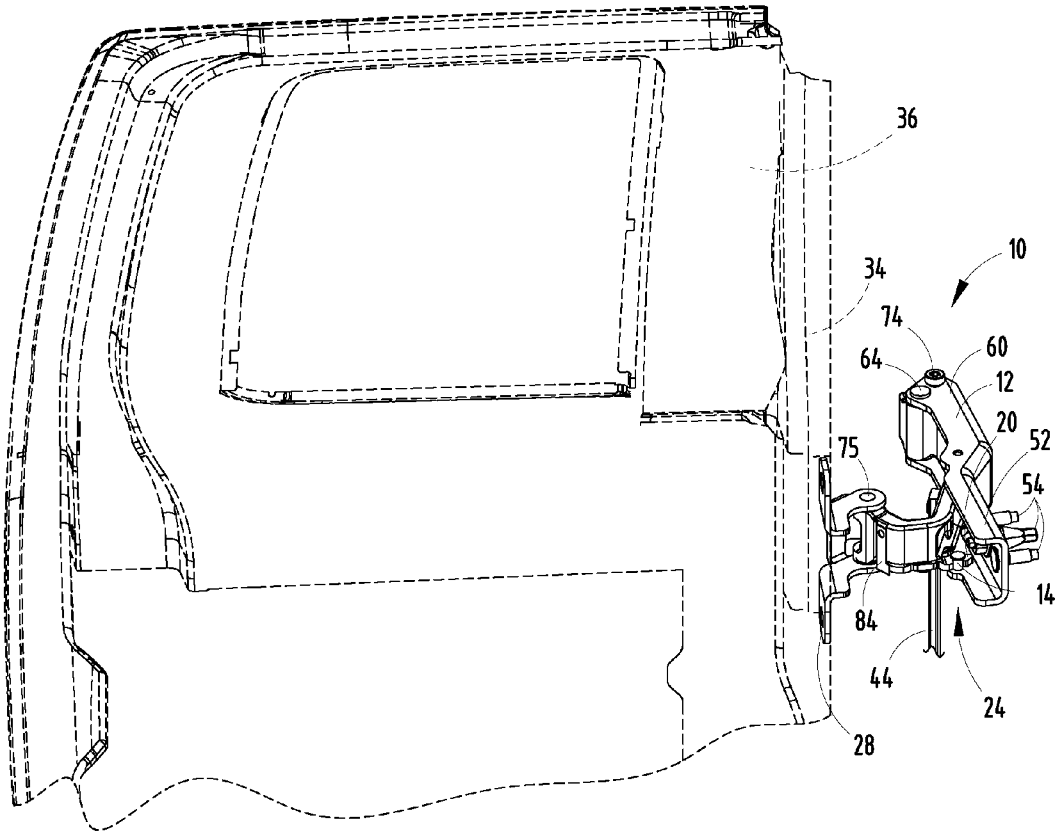
FIG. 4 is a front top perspective view of one embodiment of the hinge mechanism with the vehicle door swung partially outward.
Figure 4A:
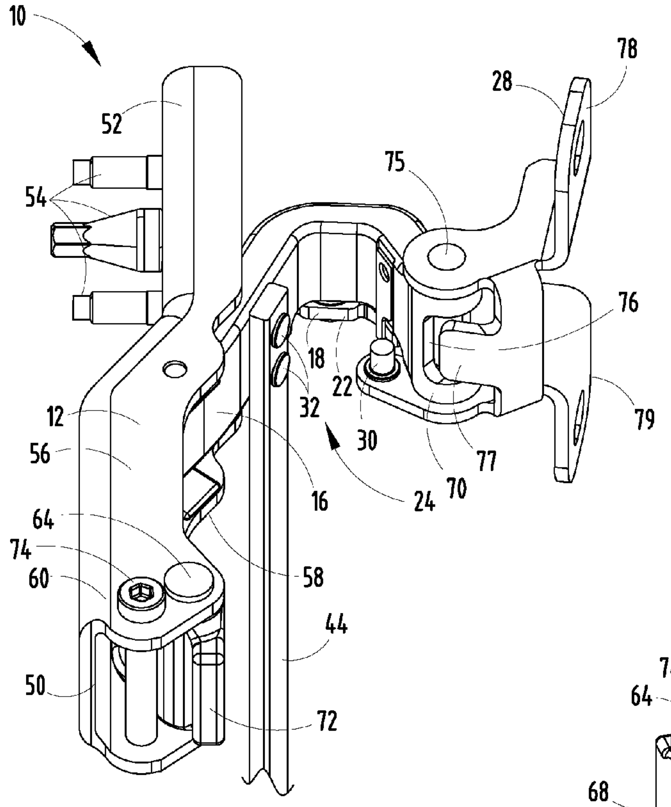
FIG. 4A is a rear top perspective view of the hinge mechanism of FIG. 4.
Figure 4B:
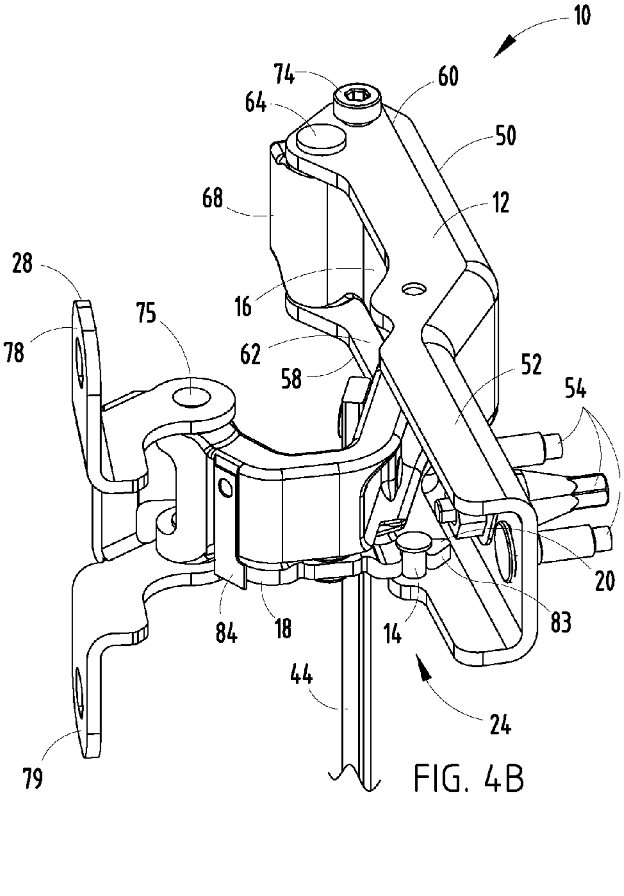
FIG. 4B is a front top perspective view of the hinge mechanism of FIG. 4.
Figure 4C:
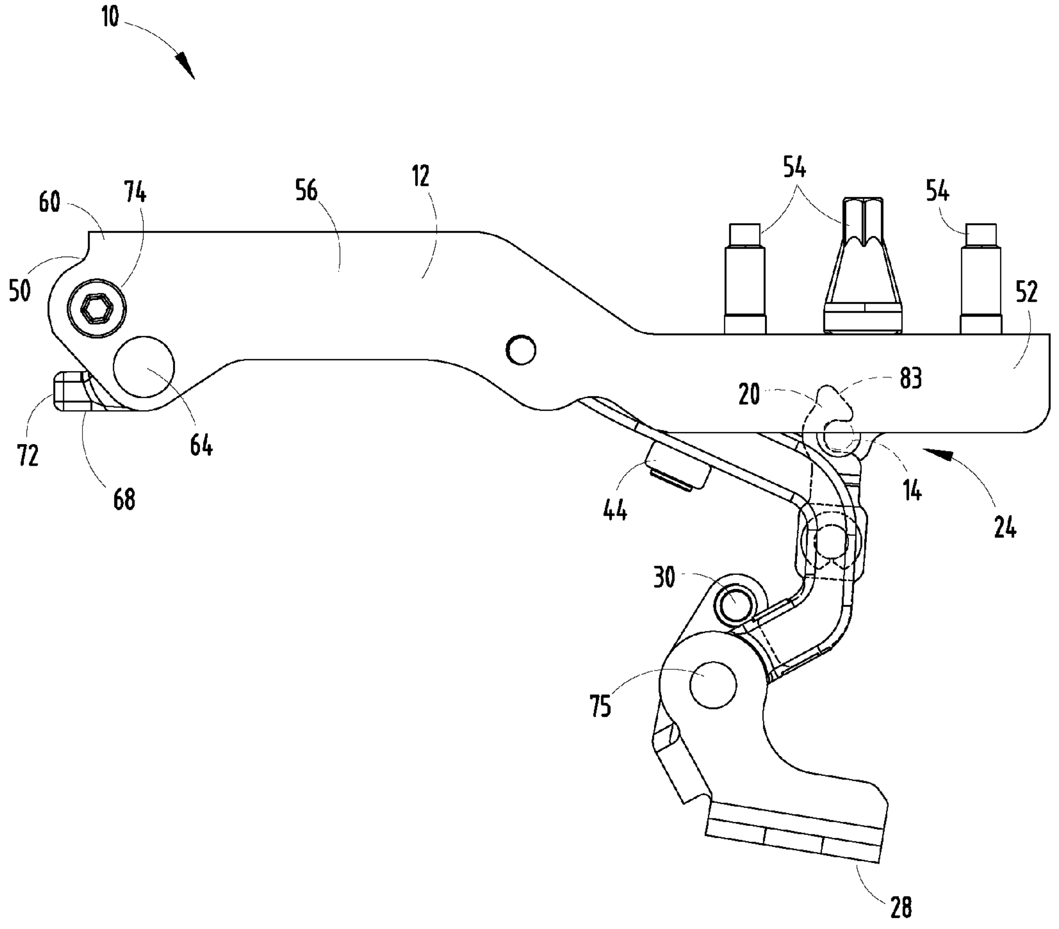
FIG. 4C is a top elevational view of the hinge mechanism of FIG. 4.

As shown in FIGS. 4-4C, the door bracket 28 is rotatable about the door bracket pivot axis 64 to approximately 105 degrees until the lever actuation member 30 engages the abutment portion 22 of the pawl 18. When the lever actuation member 30 engages the abutment portion 22 of the pawl 18, the engagement portion 20 of the pawl 18 is urged against the biasing force of the leaf spring 84 out of engagement with the pawl engagement member 14. As the user continues to rotate the door 36 open, the lever actuation member 30 of the door bracket 28 continues to push against the abutment portion 22 until the engagement portion 20 and the pawl engagement member 14 are no longer engaged. During this stage of rotation, the pawl 18 is transitioning from the engaged position 24 to the disengaged position 26.

Figure 5:
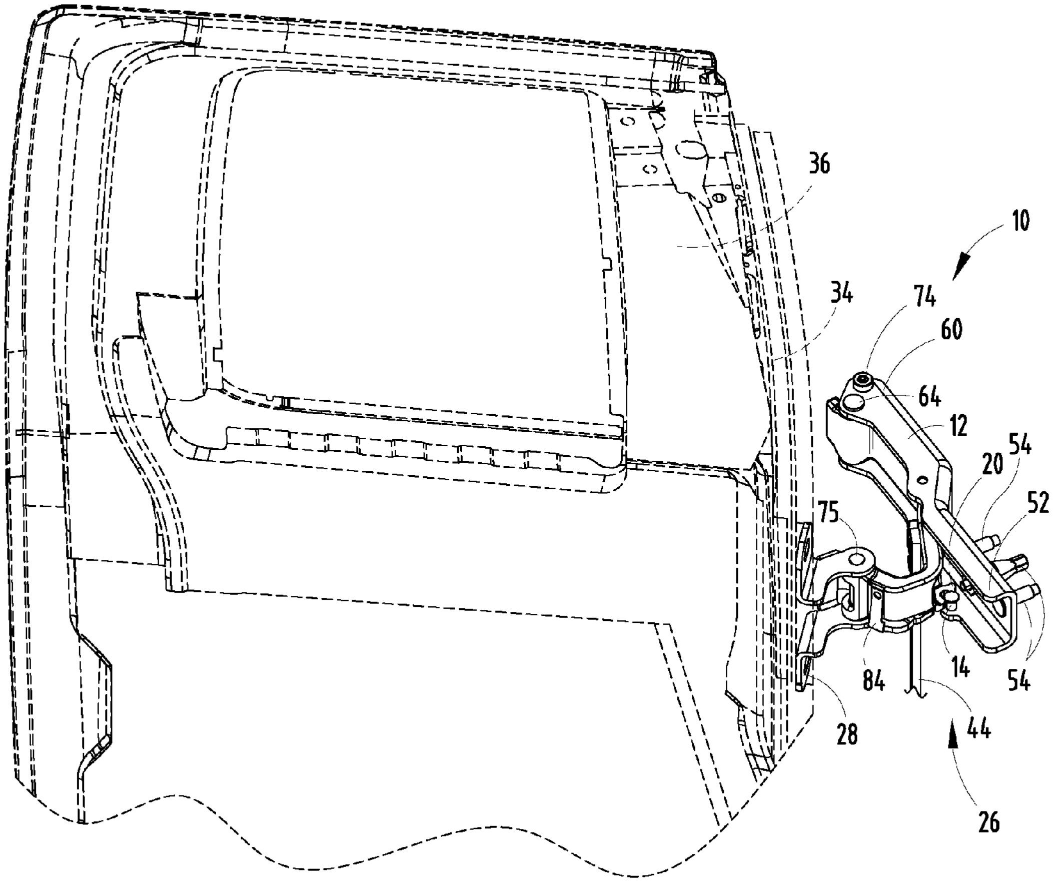
FIG. 5 is a front top perspective view of the hinge mechanism with the vehicle door approaching the fully open position.
Figure 5A:
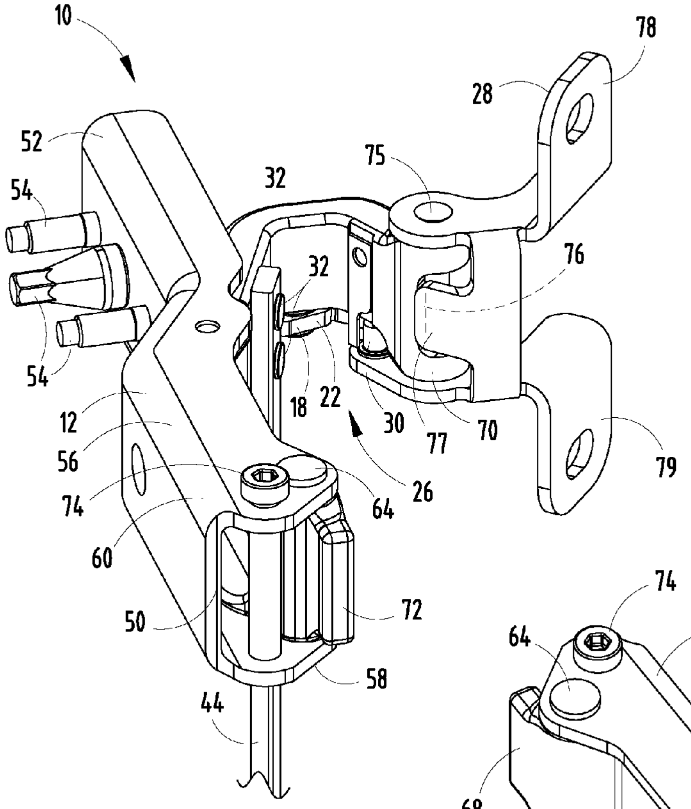
FIG. 5A is a rear top perspective view of the hinge mechanism of FIG. 5.
Figure 5B:
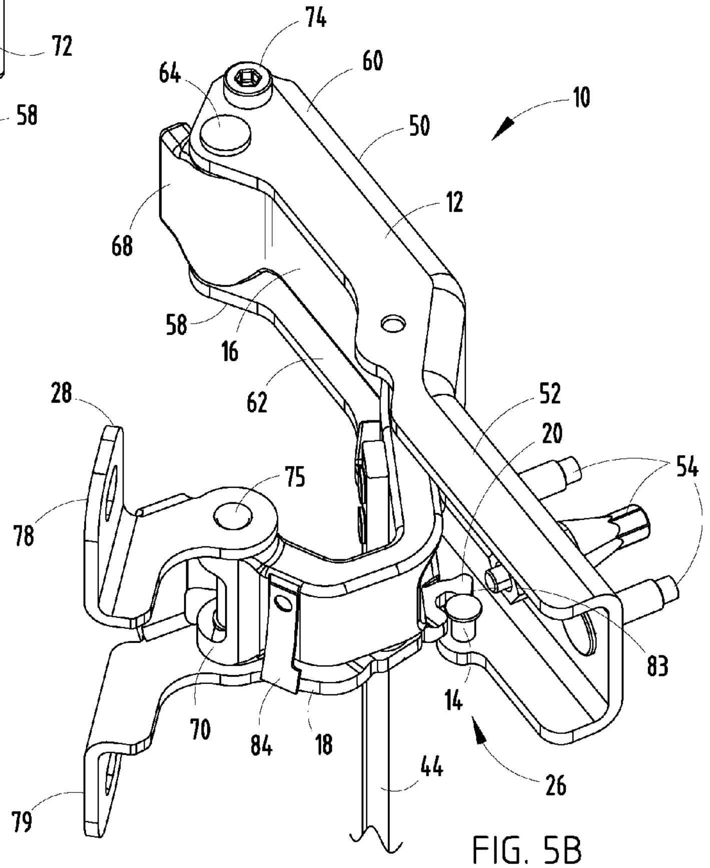
FIG. 5B is a front top perspective view of the hinge mechanism of FIG. 5.
Figure 5C:
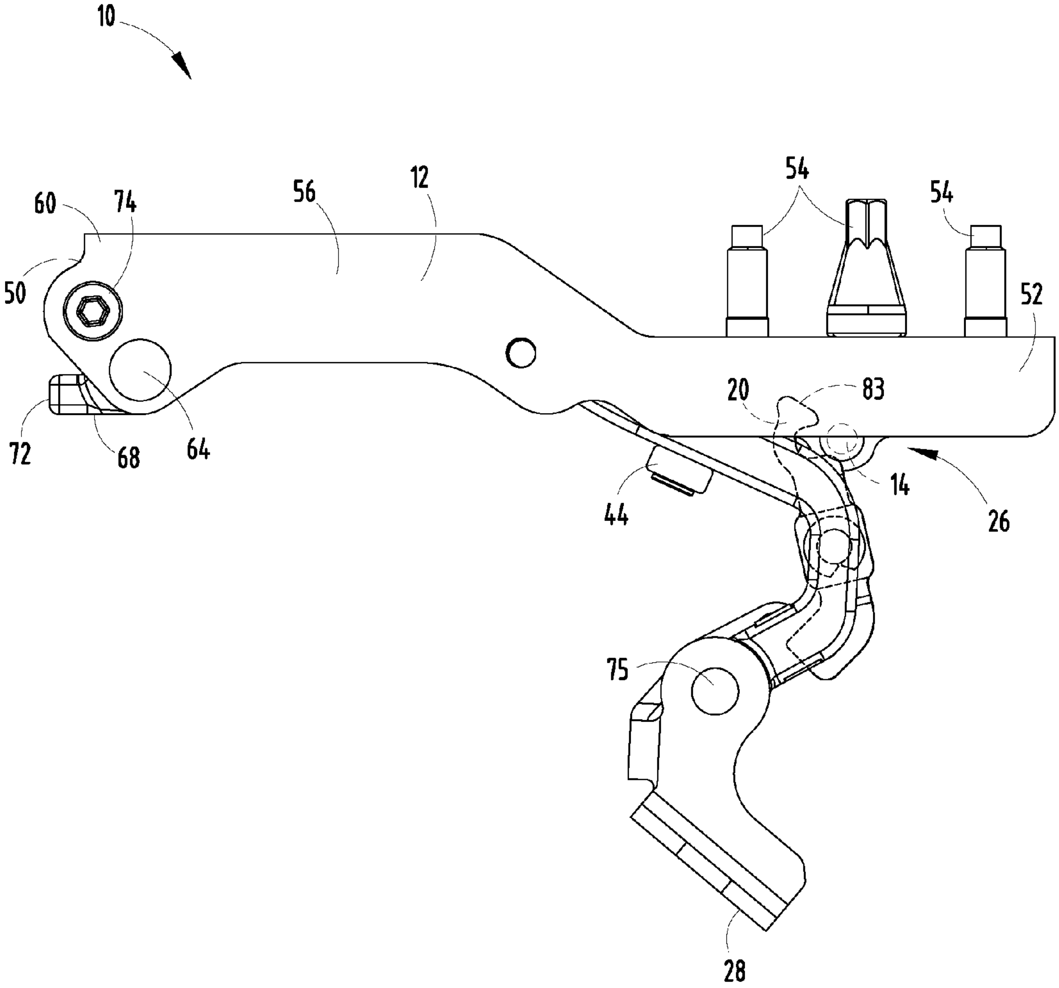
FIG. 5C is a top elevational view of the hinge mechanism of FIG. 5.

Referring now to FIGS. 5-5C, when the door bracket 28 has rotated to approximately 126 degrees, the engagement portion 20 of the pawl 18 is fully disengaged from the pawl engagement member 14, thereby entering the disengaged position 26. When the pawl 18 has become fully disengaged from the pawl engagement member 14, the swing arm 16 is then free to rotate about the vehicle bracket pivot axis 64 disposed at the rearward end 60 of the vehicle bracket 12. As the door bracket 28 and swing arm 16 begin rotating away from the pawl engagement member 14 about the pivot axis 64 at the rearward end 60 of the vehicle bracket 12, the engagement portion 20 of the pawl 18 begins to pull away from the pawl engagement member 14. At the same time, the C-shaped body of the swing arm 16 begins to withdraw from the cavity 62 at the rearward end 60 of the vehicle bracket 12.

Figure 6C:
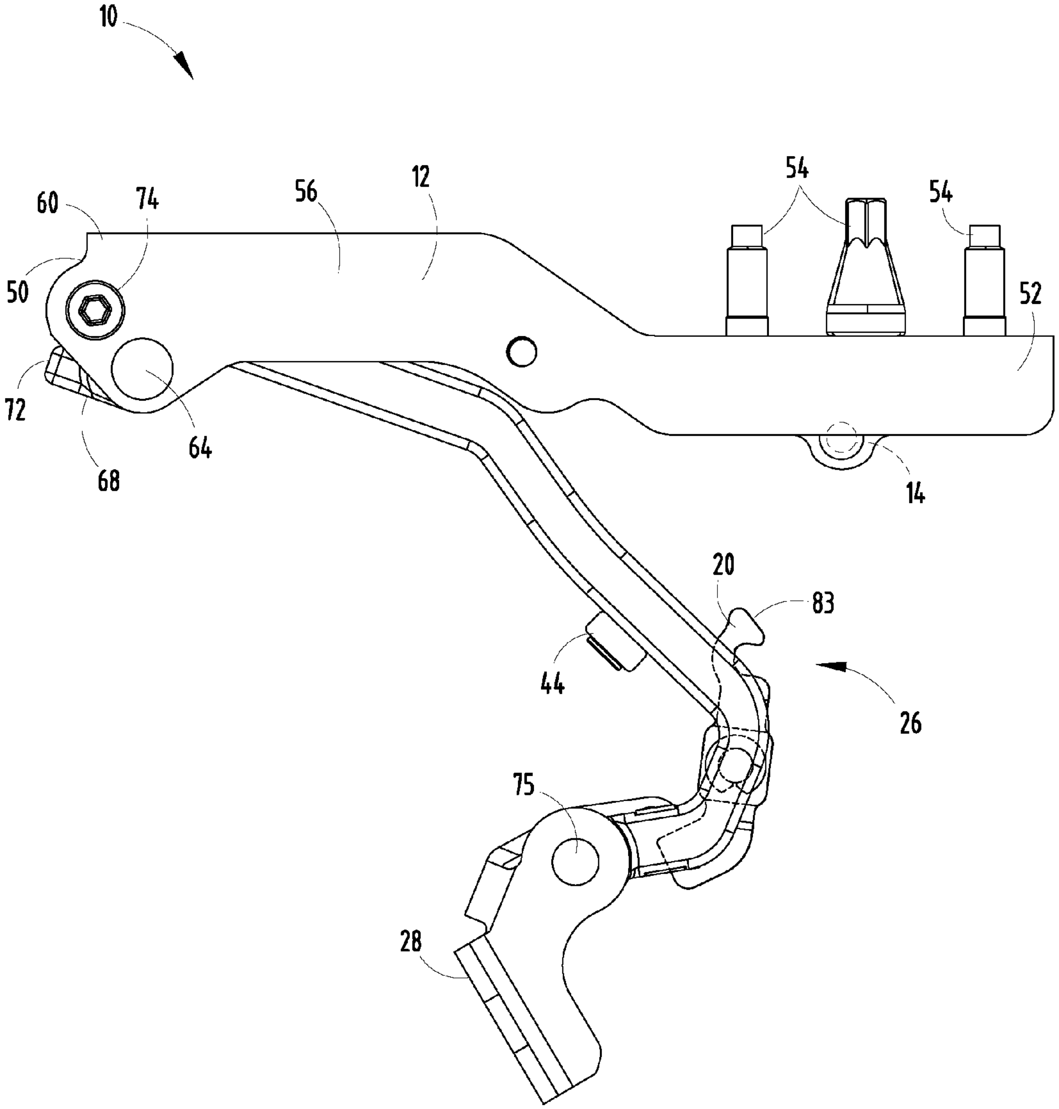
FIG. 6C is a top elevational view of the hinge mechanism of FIG. 6.

Referring now to FIGS. 6-6C, after the swing arm 16 has fully rotated about the rearward end 60 of the vehicle bracket 12 about the vehicle bracket pivot axis 64, the door 36 will be open approximately 168 degrees. The stop 72 on the distal end 70 of the swing arm 16 abuts the stop post 74 on the rearward end 60 of the vehicle bracket 12, thereby preventing further rotation beyond 168 degrees. The hinge mechanism 10 and the vehicle door 36 are now in the fully open position 39.

The nature of the design of the aforementioned hinge mechanism 10 allows for closure of the vehicle door 36 in two manners. The door 36 and door bracket 28 may be rotated about pivot axis 75 first until the door bracket 28 will not rotate any further. Then, the door 36, door bracket 28, and swing arm 16 are rotated into the closed position 37 about pivot axis 64 extending through the rearward end 60 of the vehicle bracket 12. When the vehicle door 36 is in the fully closed position 37, the engagement portion 20 of the pawl 18 will re-engage the pawl engagement member 14 securing the vehicle door 36 in place.

Alternatively, the vehicle door 36 may close by rotation of the swing arm 16 about pivot axis 64 that extends through vehicle bracket 12 first. After the swing arm 16 has entered the cavity 62 and come into abutting contact with the vehicle bracket 12, the door 36 is then rotated about pivot axis 75 and extends through the door bracket 28 and swing arm 16 until the engagement portion 20 of the pawl 18 once again fully engages the pawl engagement member 14. When the swing arm 16 is fully received in the recess of vehicle bracket 12 and the engagement portion 20 of the pawl 18 has engaged the pawl engagement member 14, the door 36 will be in the fully closed position 37. Stated differently, the vehicle door 36 can rotate about the pivot axis 75 first or about the pivot axis 64 during closing. In either instance, the door 36 will close properly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hinge mechanism comprising:
a vehicle bracket having a pawl engagement member;
a horizontally-rotating swing arm rotatably coupled with the vehicle bracket;
a pawl having an engagement portion, an abutment portion, and being connected with the swing arm and operable between an engaged position and a disengaged position;
a door bracket rotatably coupled with the swing arm; and
a lever actuation member extending from the door bracket and aligned to engage the abutment portion.

2. The vehicle hinge mechanism of claim 1, further comprising:
a leaf spring disposed on the door bracket that biases the pawl to the engaged position.

3. The vehicle hinge mechanism of claim 1, further comprising:
a vehicle door fixedly connected to the door bracket by mechanical fasteners.

4. The vehicle hinge mechanism of claim 1, wherein the lever actuation member abuts the pawl when the door bracket has rotated between 95 degrees and 115 degrees relative to the vehicle bracket.

5. The vehicle hinge mechanism of claim 4, wherein the lever actuation member abuts the pawl when the door bracket has rotated approximately 105 degrees relative to the vehicle bracket.

6. The vehicle hinge mechanism of claim 1, wherein the pawl is disposed between the vehicle bracket and the swing arm.

7. The vehicle hinge mechanism of claim 1, wherein the engagement portion of the pawl includes a hook-like receiver and the pawl connection member includes a pawl post on the vehicle bracket.

8. The vehicle hinge mechanism of claim 1, further comprising:
first and second stops disposed on the vehicle bracket and door bracket, respectively, that prohibit opening of the door beyond an angle between 156 degrees and 176 degrees.

9. A vehicle hinge mechanism, comprising:
a vehicle bracket having a pawl engagement member;
a swing arm operably coupled with the vehicle bracket at a first rotational axis;
a pawl connected to the swing arm and operable between an engaged position, wherein the pawl is engaged with the pawl engagement member and prevents rotation of the swing arm relative to the vehicle bracket and a disengaged position, wherein the pawl is disengaged from the pawl engagement member, thereby allowing rotation of the swing arm relative to the vehicle bracket; and
a door bracket operably coupled with the swing arm at a second rotational axis, the door bracket having a lever actuation member in rotational alignment with the pawl, such that rotation of the door bracket a predetermined distance causes the lever actuation member to contact the pawl, thereby moving the pawl to the disengaged position and allowing rotation of the swing arm relative to the vehicle bracket.

10. The vehicle hinge mechanism of claim 9, further comprising:
a leaf spring disposed on the door bracket that biases the pawl to the engaged position.

11. The vehicle hinge mechanism of claim 9, further comprising:
a vehicle door fixedly connected to the door bracket.

12. The vehicle hinge mechanism of claim 9, wherein the lever actuation member abuts the pawl when the door bracket has rotated between 95 degrees and 115 degrees relative to the vehicle bracket.

13. The vehicle hinge mechanism of claim 12, wherein the lever actuation member abuts the pawl when the door bracket has rotated approximately 105 degrees relative to the vehicle bracket.

14. The vehicle hinge mechanism of claim 9, wherein the pawl is disposed longitudinally between the vehicle bracket and the swing arm.

15. The vehicle hinge mechanism of claim 1, wherein the vehicle bracket defines a recessed cavity adapted to receive a portion of the swing arm.

16. The vehicle hinge mechanism of claim 1, wherein the swing arm and the pawl are disposed between first and second flanges of the door bracket.

17. The vehicle hinge mechanism of claim 1, wherein the engagement portion includes an angled end that facilitates capture of the pawl engagement member.

18. The vehicle hinge mechanism of claim 9, wherein the vehicle bracket defines a recessed cavity adapted to receive a portion of the swing arm.

19. The vehicle hinge mechanism of claim 9, wherein the swing arm and the pawl are disposed between first and second flanges of the door bracket.

20. The vehicle hinge mechanism of claim 9, wherein the engagement portion includes an angled end that facilitates capture of the pawl engagement member.

* * * * *